(12) United States Patent
Sherwood et al.

(10) Patent No.: US 9,615,470 B2
(45) Date of Patent: Apr. 4, 2017

(54) WIRING COMBINER BOX

(71) Applicant: SUNLINK CORPORATION, Mill Valley, CA (US)

(72) Inventors: Daniel Wylder Sherwood, Berkeley, CA (US); Dan Alexander Morales, San Francisco, CA (US); Jaquelyn H. Miyatake, San Anselmo, CA (US)

(73) Assignee: SunLink Corporation, Mill Valley, CA (US)

( * ) Notice: Subject to any disclaimer, the term of this patent is extended or adjusted under 35 U.S.C. 154(b) by 247 days.

(21) Appl. No.: 14/043,638

(22) Filed: Oct. 1, 2013

(65) Prior Publication Data
US 2014/0090866 A1    Apr. 3, 2014

Related U.S. Application Data

(60) Provisional application No. 61/709,279, filed on Oct. 3, 2012.

(51) Int. Cl.
*H05K 5/02* (2006.01)
*H02S 40/34* (2014.01)
*H02G 3/08* (2006.01)

(52) U.S. Cl.
CPC .............. *H05K 5/02* (2013.01); *H02S 40/34* (2014.12); *H02G 3/08* (2013.01); *Y10T 29/49117* (2015.01)

(58) Field of Classification Search
CPC    H02G 3/08; H02G 3/081; H05K 5/00; H05K 5/02; H05K 5/0217; H05K 5/0247; H05K 5/04; H02S 40/34; Y10T 29/49117
USPC .... 174/50, 59, 520, 535, 559; 361/600, 601, 361/679.01, 724, 730, 752, 796, 641; 220/3.2, 3.3, 4.02; 385/134, 135; 379/413.04; 439/709
See application file for complete search history.

(56) References Cited

U.S. PATENT DOCUMENTS

| | | | |
|---|---|---|---|
| 6,788,786 B1* | 9/2004 | Kessler et al. | 379/413.04 |
| 7,011,551 B2* | 3/2006 | Johansen | H01R 9/2641 |
| | | | 439/709 |
| 7,522,805 B2* | 4/2009 | Smith et al. | 385/135 |
| 7,715,682 B2* | 5/2010 | Beck | 385/135 |
| 7,737,360 B2* | 6/2010 | Wiemeyer | H04Q 1/13 |
| | | | 174/50 |
| 8,908,356 B2* | 12/2014 | Wang | 174/50 |
| 8,941,977 B2* | 1/2015 | Bravo et al. | 361/641 |

* cited by examiner

*Primary Examiner* — Angel R Estrada
(74) *Attorney, Agent, or Firm* — Reed Smith LLP

(57) ABSTRACT

A wiring combiner box for combining wires from photovoltaic panels includes a fuse block mounted to a side wall of an enclosure. This construction design allows for combiner boxes to be manufactured in a more narrow enclosure, and also makes it easier to connect the solar panel circuit conductors to the fuse terminal inputs, as the fuse terminal inputs are now more visible.

8 Claims, 7 Drawing Sheets

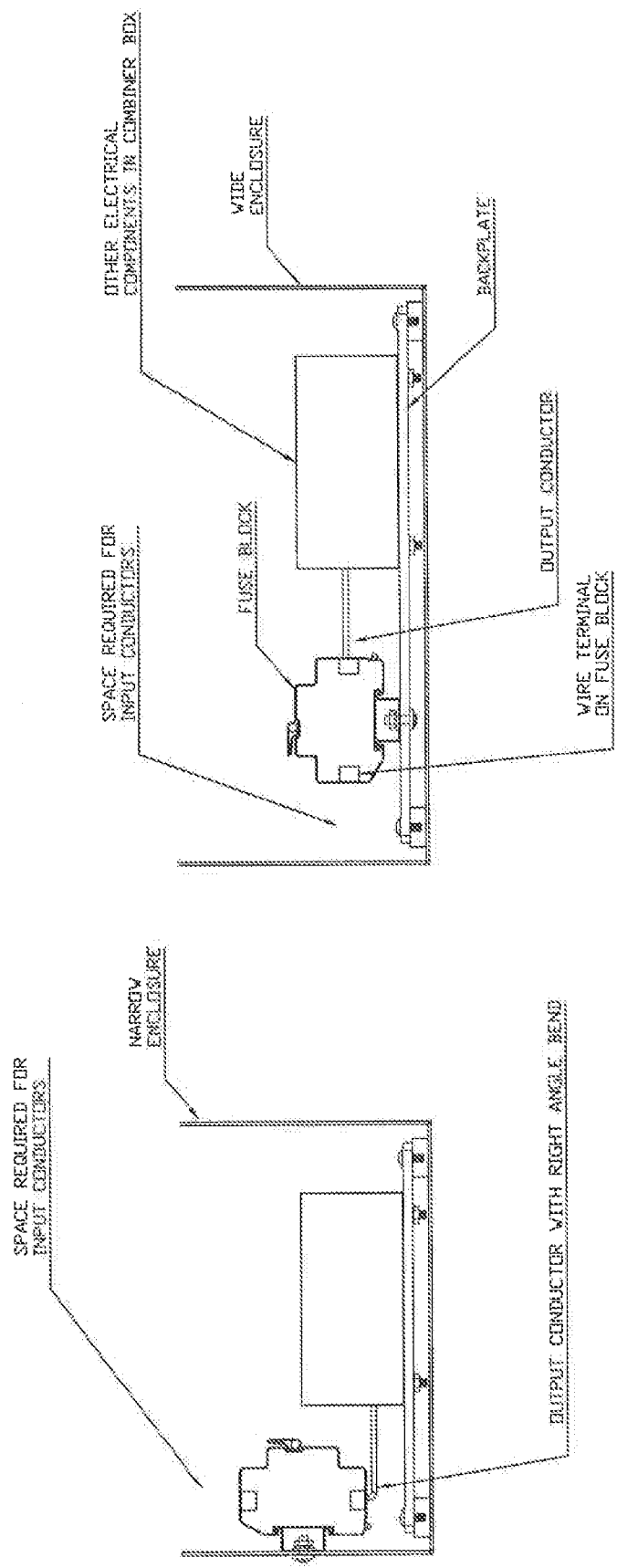

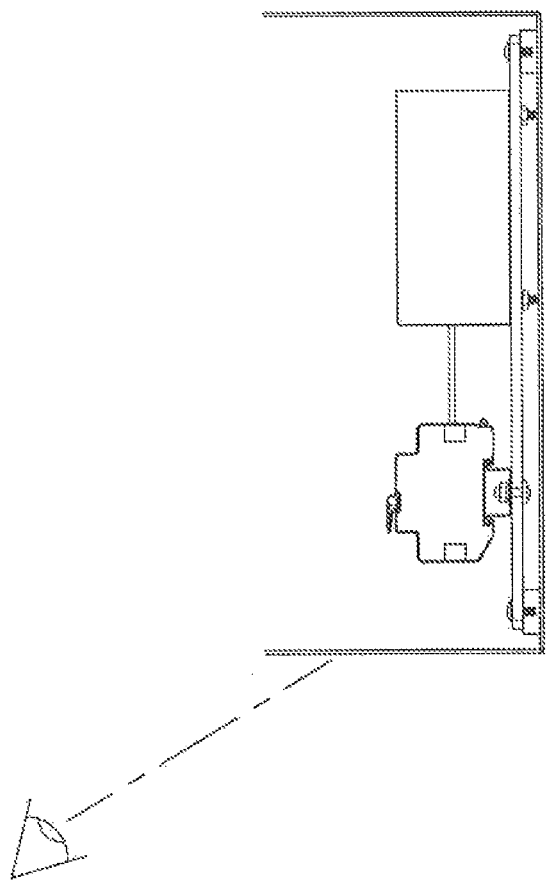
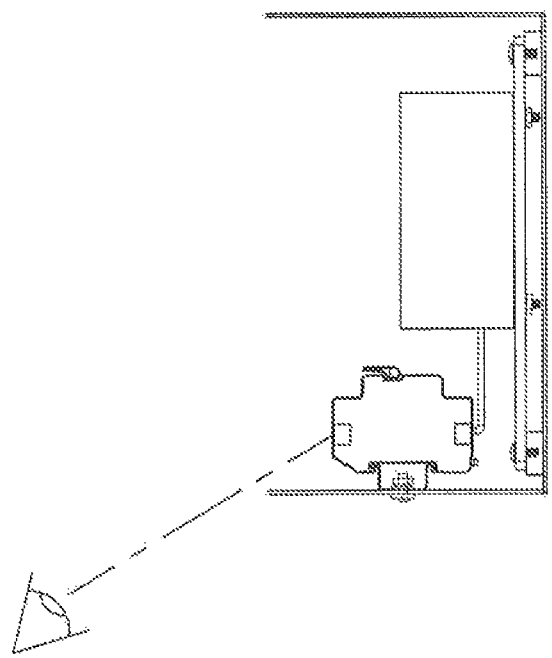
FIG. 2B
(Prior Art)
FIG. 2A

WIRING COMBINER BOX

This application claims priority to U.S. Provisional Application Ser. No. 61/709,279, filed Oct. 3, 2012, entitled Wiring Combiner Box, the disclosure of which is hereby incorporated by reference.

BACKGROUND OF THE INVENTION

1. Field of the Invention

The present invention relates generally to a wiring combiner box that combines wiring from a plurality of photovoltaic panels.

2. Description of the Related Art

As shown in FIGS. 1B, 2B, 3B, 4A, 5A and 6A, prior art wire combiner boxes mount the wiring fuse block on the backplane of the enclosure. Such a design requires the use of a wider enclosure to accommodate both the size of the fuse block and an additional space between the fuse block and the enclosure to allow for the attachment of the external wiring.

In addition, the prior art construction requires access to the side of the enclosure in order to run the wiring or perform maintenance.

BRIEF DESCRIPTION OF THE DRAWINGS

The present invention will be readily understood by the following detailed description in conjunction with the accompanying drawings, wherein like reference numerals designate like structural elements, and in which:

FIG. 1A is a side view of a combiner box according to an embodiment of the present invention;

FIG. 1B is a side view of a prior art combiner box;

FIG. 2A is a side view of a combiner box according to an embodiment of the present invention;

FIG. 2B is a side view of a prior art combiner box;

SUMMARY OF THE INVENTION

Figure 3B:
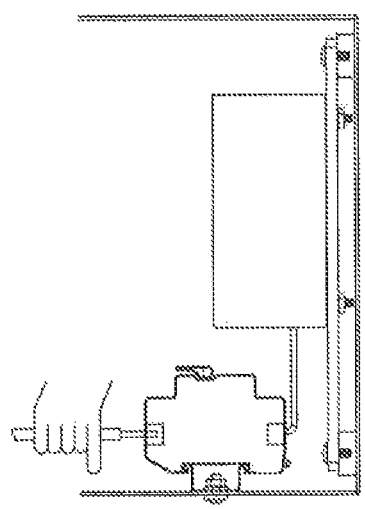
FIG. 3B is a side view of a prior art combiner box.

In general, according to an embodiment of the present invention, a wiring combiner box combines wires from photovoltaic panels with a fuse block mounted to a side wall of an enclosure. This construction design allows for combiner boxes to be manufactured in a more narrow enclosure, and also makes it easier to connect the solar panel circuit conductors to the fuse terminal inputs, as the fuse terminal inputs are now more visible.

According to one embodiment, a wiring combiner box comprises an enclosure having a back plate support and a side wall, a fuse block mounted to the side wall of the enclosure, and an opening for receiving wires from photovoltaic panels. The wiring combiner box may further include a rail, or specifically a DIN rail, connecting the fuse block to the side wall. The wiring combiner box may also include additional electrical components are mounted to the back plate support, wherein the wires attached to the fuse block connect to the additional electrical components mounted on the back plate using a conductor with a right angle bend.

According to another embodiment, a method of combining wires from different photovoltaic panels comprises routing the wires into a wiring combiner box enclosure, and attaching the wires to a fuse block mounted on a side wall, the fuse block mounted perpendicular to a back plate support of the enclosure.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

The present invention generally relates to the use and construction of wiring combiner boxes suitable for collection of electrical current generated by photovoltaic cell panels (solar panels) and other energy sources. Solar panel combiner boxes consist of fuse blocks mounted in an enclosure wherein the input terminals of the fuse block are connected to independent solar panel circuits producing variable amounts of current and the output terminals of the fuse blocks are combined into a single electrical circuit with a given amount of current equal to the sum of all the currents entering the input side of the fuse blocks. Combiner boxes may or may not also include other electrical components such as disconnect switches, surge protection devices, high power contactors and measurement and instrumentation devices. Prior to this invention all solar combiner boxes were constructed with fuse blocks mounted flat inside the enclosure, typically on a back plate, a flat surface that is designed to mount inside the enclosure and onto which all the electrical components are themselves mounted. The enclosure itself is the highest cost component in a combiner box and the size of the enclosure has the most important effect on the cost of manufacturing a combiner box.

The present invention, in contrast, mounts the fuse block in a combiner box to the side wall of the enclosure, and the routing of the combined current to the additional electrical components mounted on the back plate using a conductor with a right angle bend. This construction design allows for combiner boxes to be manufactured in a more narrow enclosure than was previously possible which reduces manufacturing cost. This also makes it easier to connect the solar panel circuit conductors to the fuse terminal inputs, as the fuse terminal inputs are now more easily visible than in combiner boxes manufactured prior to this invention. Finally, it is easier to connect the solar panel circuit conductors to the fuse terminal inputs, as the fuse terminal inputs are now more easily accessible than in combiner boxes manufactured prior to this invention.

As illustrated in FIG. 1A, the present invention is a wiring combiner box that mounts the fuse block on a side of an enclosure. This design allows the enclosure to be made smaller, as compared to the prior art design, shown in FIG. 1B. Specifically, mounting the fuse block on the side of the enclosure not only reduces the amount of space occupied by the fuse block on the back of the enclosure, but the side mount eliminates the need to provide additional space next to the fuse block to allow for the manipulation and placement of the wiring (see space in FIG. 1B next to fuse block).

By significantly reducing the size of the enclosure, the overall system cost can be reduced.

Figure 3A:
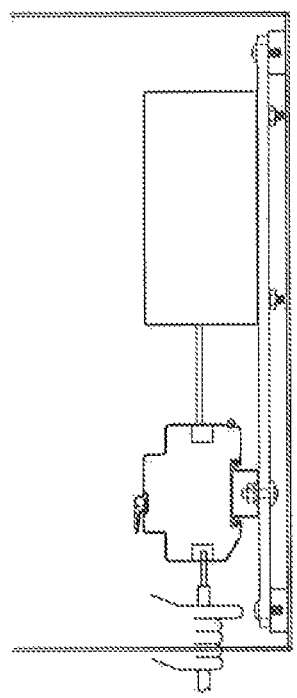
FIG. 3A is a side view of a combiner box according to an embodiment of the present invention.

An additional benefit of the present invention is illustrated in FIGS. 2A and 2B. According to the present design, a worker can easily visually see the fuse block connector inputs from the front of the enclosure (FIG. 2A), whereas in the prior art design (FIG. 2B), the electrical connections were not easily seen from the front of the enclosure. Similarly, as shown in FIGS. 3A and 3B, the wire input connectors on the side mounted fuse block is easier to access (FIG. 3A), than the prior art fuse blocks (FIG. 3B).

Figure 4B:
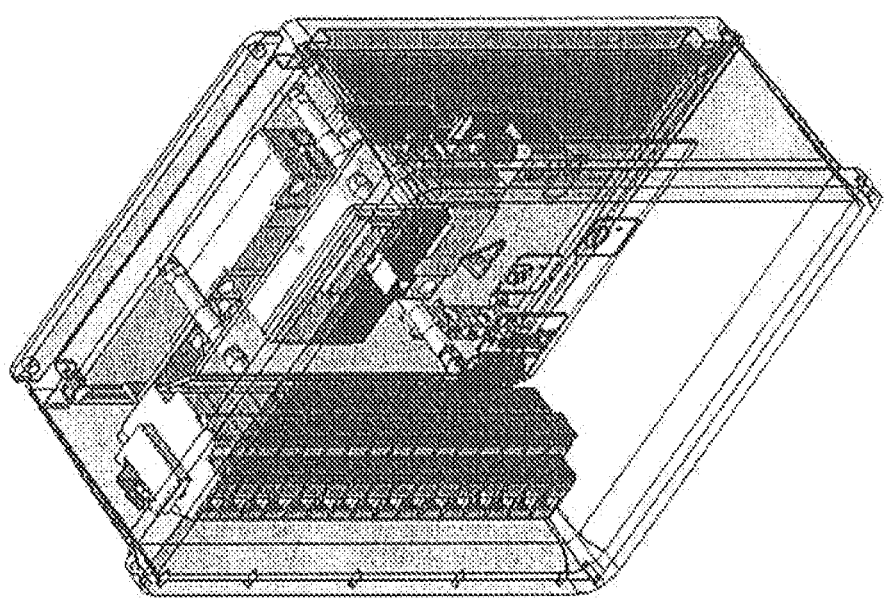
FIG. 4B is a perspective view of a combiner box according to an embodiment of the present invention.
Figure 4A:
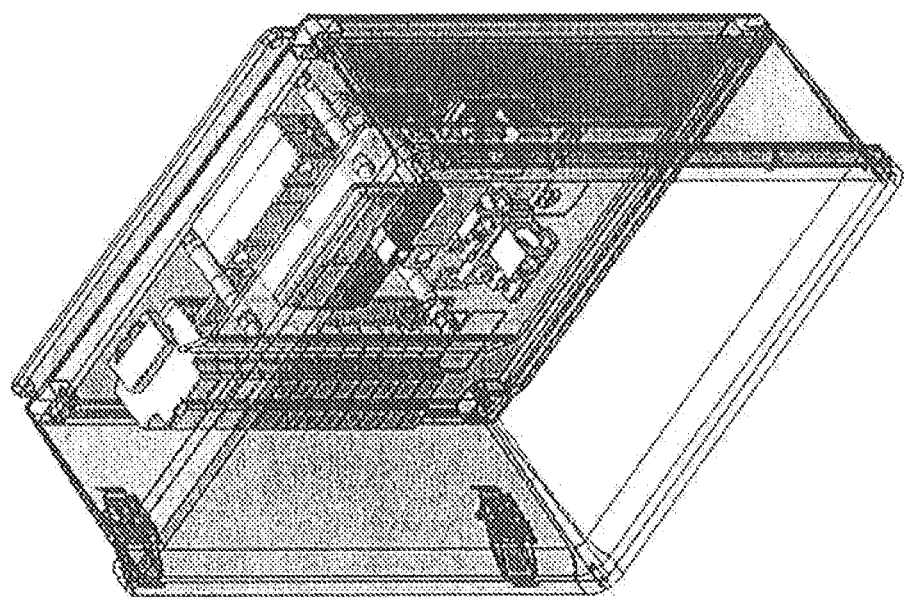
FIG. 4A is a perspective view of a prior art combiner box.
Figure 5A:
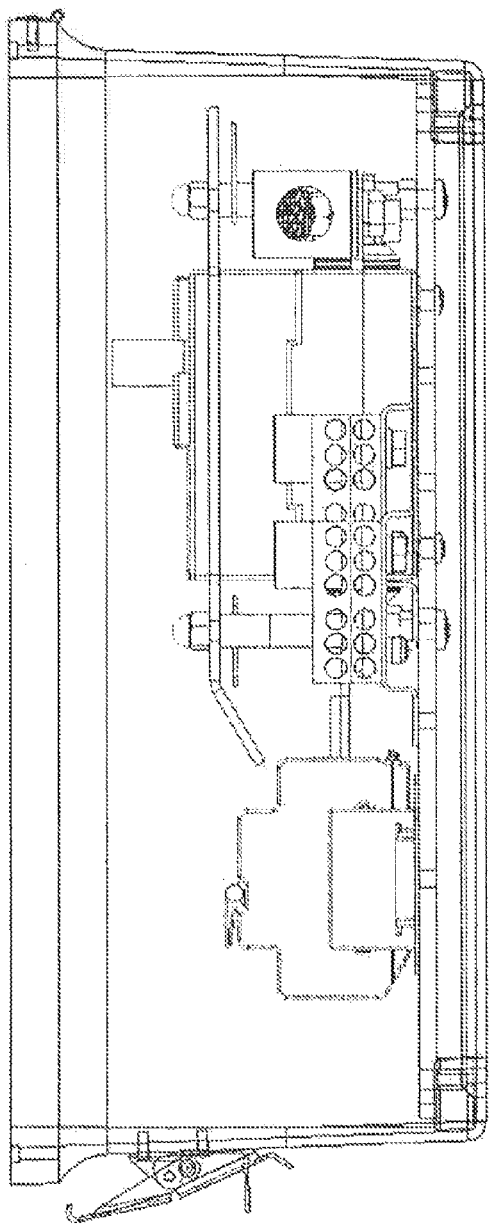
FIG. 5A is a side view of a prior art combiner box.
Figure 5B:
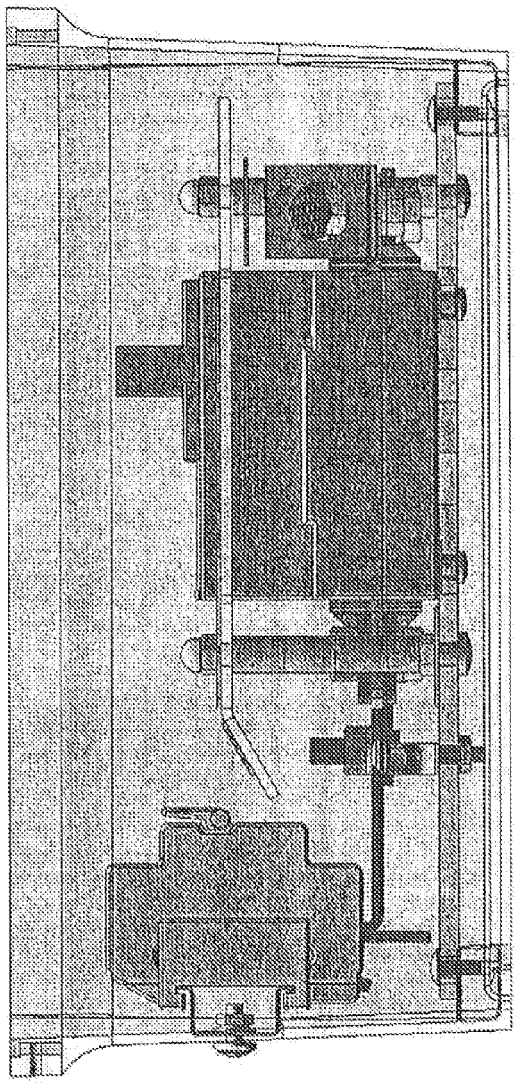
FIG. 5B is a side view of a combiner box according to an embodiment of the present invention.

FIGS. 4A and 4B show a perspective view of the present invention (FIG. 4B) as compared to the prior art (FIG. 4A). FIGS. 5A and 5B show a side view of the present invention (FIG. 5B) as compared to the prior art (FIG. 5A). Mounting the fuse block on the side of the enclosure creates a much more efficient use of space.

Figure 6A:
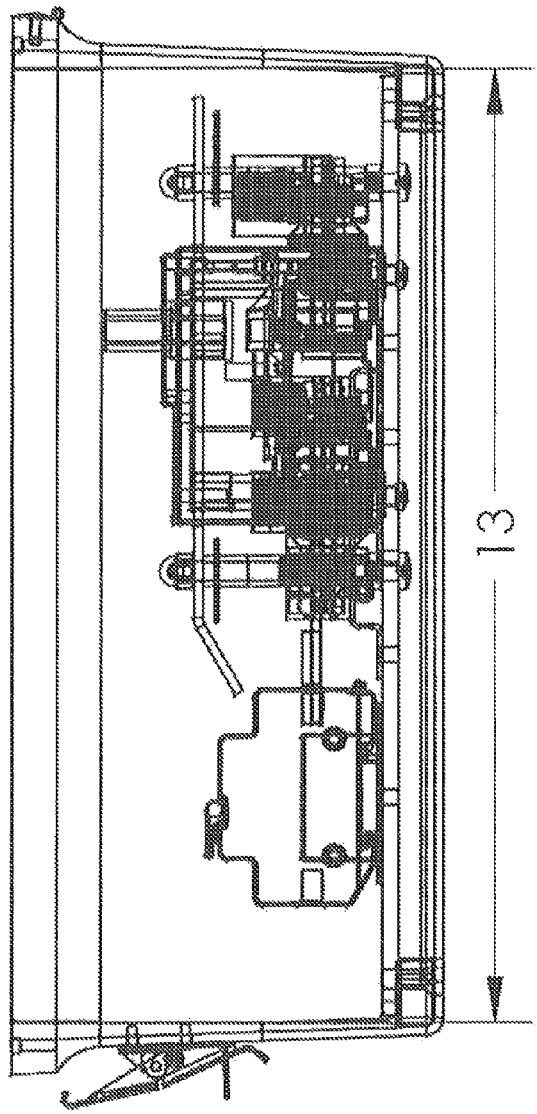
FIG. 6A is a side view of a prior art combiner box.
Figure 6B:
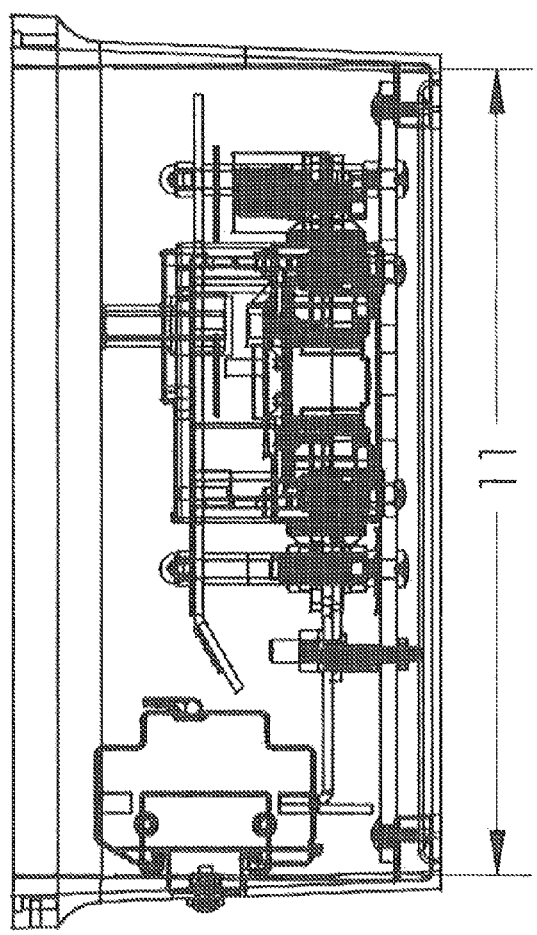
FIG. 6B is a side view of a combiner box according to an embodiment of the present invention.

Specifically, as illustrated in FIGS. 6A and 6B, the enclosure of the present invention (FIG. 6B) can be made two inches narrower than the enclosure of the prior art design (FIG. 6A) (for example, 11 inches vs. 13 inches, in one embodiment).

Figure 7:
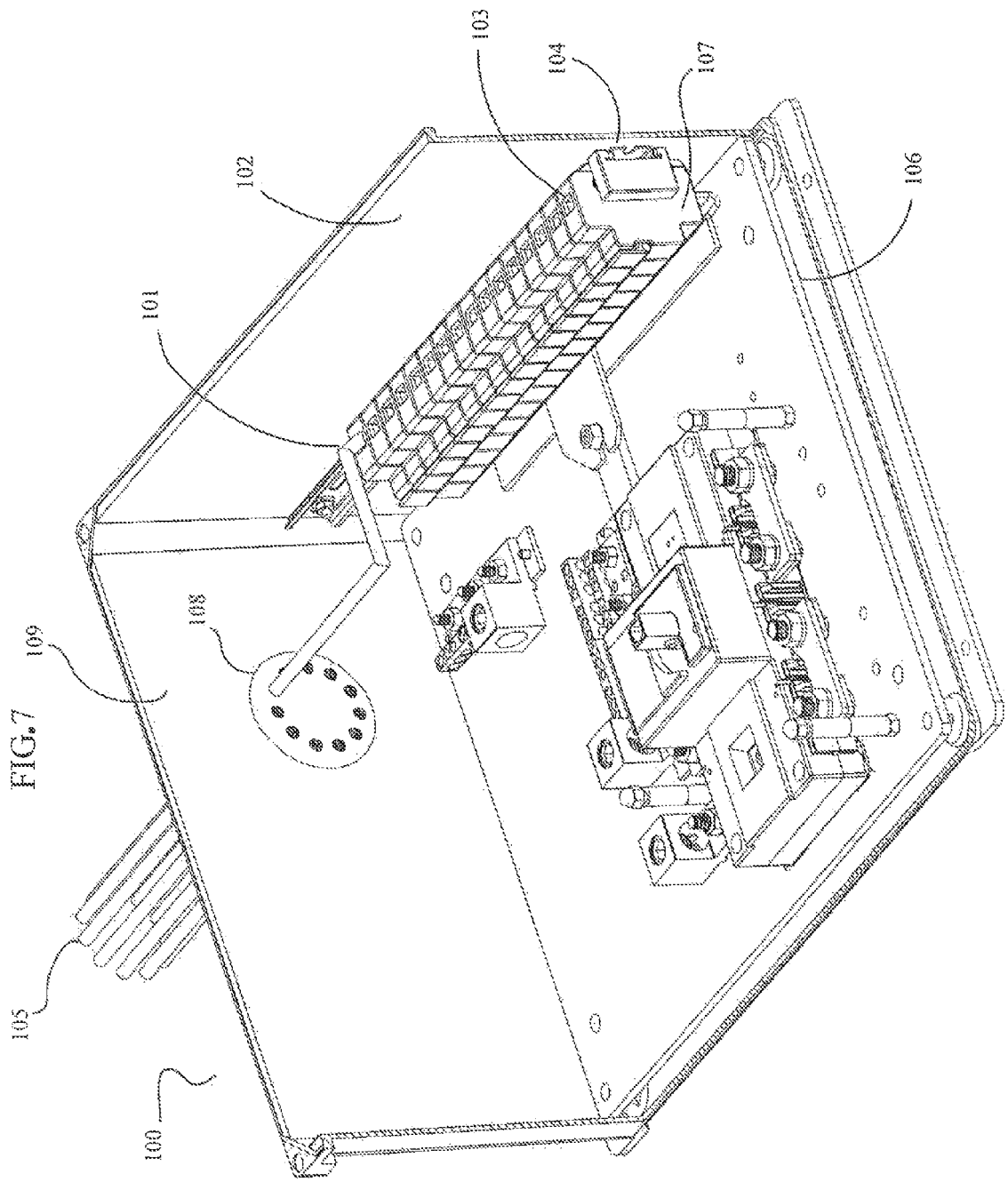
FIG. 7 is an isometric cut-away assembly of a wiring combiner box according to an embodiment of the present invention.

An embodiment of the present invention is illustrated in FIG. 7, which depicts a wiring combiner box 100 with sides and components removed for clarity. The isometric cut-away figure shows the assembly of a wiring combiner box 100 that is part of a larger photovoltaic system (not shown). As illustrated, a wiring combiner box assembly 100 includes a photovoltaic wire 101, with a distal end 105 that connects to a photovoltaic system, and a proximal end that connects to a fuse 103 of a fuse block 107. The fuse block 107 mounts to a side wall 102 of the wiring enclosure via a rail connection 104. The remaining electrical components are mounted to a back plate support 106. Preferably, the opening 108 for the wires is on a wall 109 adjacent (perpendicular) to the side wall 102, but the wires may be fed into the enclosure with any convenient configuration. The combined current from the wires attached to the fuse block 107 are connected to the electrical components on the back plate support with a conductor, preferably a conductor with a right angle bend out of the fuse block to the back plate components.

Those familiar with the art understand that aggregating a plurality of conductors originating from photovoltaic panels is desirable in installations. A bundle of wires, including wire 105, originates from a photovoltaic system, enters into the wiring combiner box 100, and terminates at a fuse 101. In this embodiment, the fuse block 107 is mounted to the side wall of the enclosure 102, such that a fuse opening 103 that accepts the photovoltaic wires is parallel with the side wall 102. This is desirable for the reduction of enclosure space, and for visibility of the termination of each photovoltaic conductor to a fuse. This embodiment illustrates that the fuse block 107 is connected to the side wall using a rail, specifically a DIN rail 104, which is a technique to mechanically connect electrical components en masse.

Alternatively the fuse block 107 may be connected directly to the side wall 102 such that the opening of the input of the fuse is parallel to the side wall 102. Prior art designs of wiring combiner boxes connect the fuse block 107 to a back plate 106 which is perpendicular to the side wall and parallel to the back plane of the enclosure. Other components are generally mounted on the black plate support 106 within the enclosure. As can clearly be seen in FIG. 7, the present design is more efficient in terms of space utilization, and also provides a more convenient visual identification of the wires and fuses in the field.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A wiring combiner box comprising:
an enclosure having a back plate support and a side wall, wherein the side wall is perpendicular to the back plate support;
a fuse block mounted to the side wall of the enclosure; and
an opening for receiving wires from photovoltaic panels;
wherein the wires from the photovoltaic panels are attached to fuses in the fuse block.

2. The wiring combiner box of claim 1, further comprising a DIN rail connecting the fuse block to the side wall.

3. The wiring combiner box of claim 2, wherein additional electrical components are mounted to the back plate support.

4. The wiring combiner box of claim 3, wherein the opening for receiving the wires is located on an adjacent enclosure face to the side wall.

5. The wiring combiner box of claim 3, wherein the wires attached to the fuse block connect to the additional electrical components mounted on the back plate using a conductor with a right angle bend, the conductor connected to a bottom of the fuse block.

6. A wiring combiner box comprising:
an enclosure comprising a back plate support and a side wall, wherein the side wall is perpendicular to the back plate support;
a fuse block mounted to the side wall of the enclosure;
an opening in the enclosure for receiving wires from photovoltaic panels;
electrical components mounted to the back plate support;
the wires connected to fuses in the fuse block; and
a conductor with a right angle bend attached to a bottom of the fuse block to connect the additional electrical components mounted on the back plate to the wires attached to the fuse block.

7. The wiring combiner box of claim 6, wherein a DIN rail connects the fuse block to the side wall.

8. A method of combining wires from different photovoltaic panels, the method comprising:
routing the wires into a wiring combiner box enclosure; and
attaching the wires to a fuse block mounted on a side wall, the fuse block mounted perpendicular to a back plate support of the enclosure, such that the wires are routed with a right angle bend to the fuse block.

* * * * *